United States Patent
Lin

(10) Patent No.: US 9,905,195 B2
(45) Date of Patent: Feb. 27, 2018

(54) IMAGE PROCESSING METHOD

(71) Applicant: ASUSTeK COMPUTER INC., Taipei (TW)

(72) Inventor: Chia-Ching Lin, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/263,370

(22) Filed: Sep. 13, 2016

(65) Prior Publication Data
US 2017/0076691 A1  Mar. 16, 2017

(30) Foreign Application Priority Data

Sep. 16, 2015 (TW) .............................. 104130681 A

(51) Int. Cl.
*G09G 5/02* (2006.01)
*H04N 1/60* (2006.01)

(52) U.S. Cl.
CPC ............. *G09G 5/02* (2013.01); *H04N 1/6005* (2013.01); *H04N 1/6008* (2013.01); *G09G 2320/0666* (2013.01); *G09G 2360/16* (2013.01)

(58) Field of Classification Search
CPC ............. G09G 5/02; G09G 2320/0666; G09G 2360/16; H04N 1/6005; H04N 1/6008
See application file for complete search history.

(56) References Cited

U.S. PATENT DOCUMENTS

| 7,697,165 B2 | 4/2010 | Osaki et al. | |
|---|---|---|---|
| 8,705,856 B2* | 4/2014 | Kang | G09G 3/36 358/1.9 |
| 2010/0232694 A1* | 9/2010 | Oicherman | G09G 5/02 382/167 |

FOREIGN PATENT DOCUMENTS

| CN | 1972368 | 5/2007 |
|---|---|---|
| CN | 103209331 | 7/2013 |
| EP | 2802139 | 11/2014 |
| TW | 201443865 | 11/2014 |

* cited by examiner

*Primary Examiner* — Antonio A Caschera
(74) *Attorney, Agent, or Firm* — JCIPRNET

(57) ABSTRACT

The image processing method includes following steps. Determine an image display space of an CIELCH color space corresponding to an original color space. Convert a plurality of first pixel data of the original color space to a plurality of second pixel data of the CIELCH color space. Perform an image adjustment process to the second pixel data of the CIELCH color space to obtain a plurality of third pixel data of the CIELCH color space, wherein the third pixel data is restricted within the image display space. Convert the third pixel data of the CIELCH color space to a plurality of fourth pixel data of the original color space to set an image displayed by a display apparatus.

9 Claims, 3 Drawing Sheets

IMAGE PROCESSING METHOD

CROSS-REFERENCE TO RELATED APPLICATION

This application claims the priority benefit of Taiwan application serial No. 104130681, filed on Sep. 16, 2015. The entirety of the above-mentioned patent application is hereby incorporated by reference herein and made a part of specification.

BACKGROUND OF THE INVENTION

Field of the Invention

The invention relates to an image processing method and, more particularly, to an image processing method with color space conversion.

Description of the Related Art

Along with development of the display area, the image display function is widely used in many types of electronic devices. In order to obtain image with high quality and bright color, color saturation of the image can be increased to obtain brighter color and clearer image.

Generally speaking, a common color space is a RGB color space. However, a distortion image occurs when adjusting the RGB color space directly or only increase single color component of the image. Therefore, pixel data of the RGB color space is converted to pixel data of other color space first. Then the converted pixel data is performed with an image processing. The image processing performed in other color space decreases the image distortion. However, few pixel data may exceed the viewable range and affect the image quality when converting the processed pixel data back to the RGB color space.

BRIEF SUMMARY OF THE INVENTION

According to one aspect of the disclosure, an image processing method, comprises: determining an image display space of an CIELCH color space corresponding to an original color space; converting a plurality of first pixel data of the original color space to a plurality of second pixel data of the CIELCH color space; performing an image adjustment process to the plurality of second pixel data of the CIELCH color space to obtain a plurality of third pixel data of the CIELCH color space, wherein the third pixel data are restricted within the image display space; and converting the plurality of third pixel data of the CIELCH color space to a plurality of fourth pixel data of the original color space to set an image displayed by a display apparatus.

According to the image processing method disclosed, the image display space of the CIELCH color space corresponding to the original color space is determined, the pixel data of the CIELCH color space is restricted in the image display space, therefore, it avoids generating incorrect or un-displayable pixel data when converting back the pixel data of the CIELCH color space to the original color space, which can improve the quality of the image.

These and other features, aspects and advantages of the present invention will become better understood with regard to the following description, appended claims, and accompanying drawings.

DETAILED DESCRIPTION OF THE EMBODIMENTS

Figure 1:
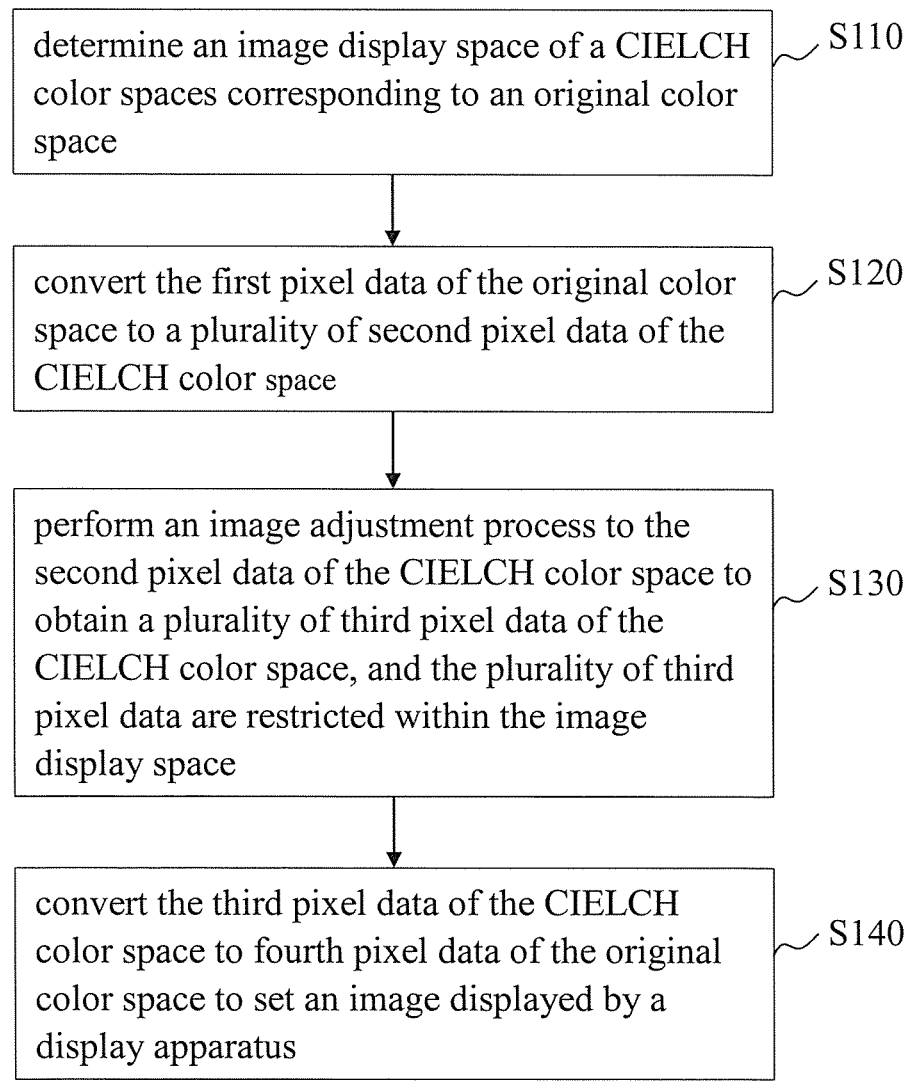
FIG. 1 is a flow chart showing an image processing method according to an embodiment.

FIG. 1 is a flow chart showing an image processing method according to an embodiment. The image processing method of the embodiment implemented by software which executed by a digital signal processor (DSP), a universal Central Processing Unit (CPU), or by an application-specific integrated circuit (ASIC).

Please refer to FIG. 1. The image processing method includes following steps. Firstly, determine an image display space of a CIELCH color spaces corresponding to an original color space (step S110). That is, determine pixel data that can be correctly converted from the CIELCH color space to the original color space. The original color space is one of a RGB color space, an HSV color space, a YCrCb color space, and a CIELuv color space.

Generally speaking, the CIELCH color space is an irregular curved surface body without a rectangle boundary. Conventional image processing software usually sets a rectangle space contains an image display space of the CIELCH color space that corresponding to the original color space. All the color combinations of the original color space can be converted to the CIELCH color space. However, the color combinations in the rectangle space but not belonged to the image display space cannot be converted to displayable color combinations of the original color space.

Then, convert the first pixel data of the original color space to a plurality of second pixel data of the CIELCH color space (step S120) after a plurality of first pixel data corresponding to each pixel is obtained. And perform an image adjustment process to the second pixel data of the CIELCH color space to obtain a plurality of third pixel data of the CIELCH color space, wherein the third pixel data is restricted within the image display space of the CIELCH color space corresponding to the original color space (step S130). In an embodiment, the image adjustment process is an image brightening, a luminance correction, a contrast correction, or a sharpness correction.

In other words, in the embodiment, the adjusted result obtained from any type of the image adjustment process is still in the image display space of the CIELCH color space corresponding to the original color space. This avoids generating incorrect or un-displayable pixel data during converting the pixel data of the CIELCH color space back to the original color space.

The method is then to convert the third pixel data of the CIELCH color space to fourth pixel data of the original color space to set an image displayed by a display apparatus (step S140). As the third pixel data of the CIELCH color space is restricted within the image display space of the original color space, that is to say, as each third pixel data is corresponding to a color combination of the original color space, the fourth pixel data is corresponding to the pixel data of the original color space and shows correct color.

Figure 2:
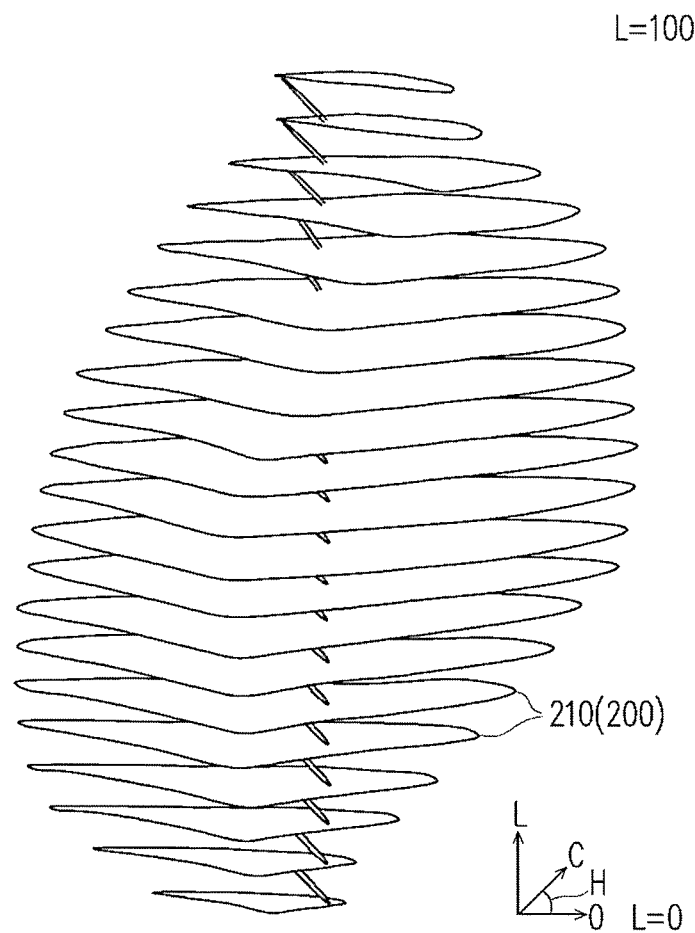
FIG. 2 is a space schematic diagram of the CIELCH color space according to an embodiment.
Figure 3:
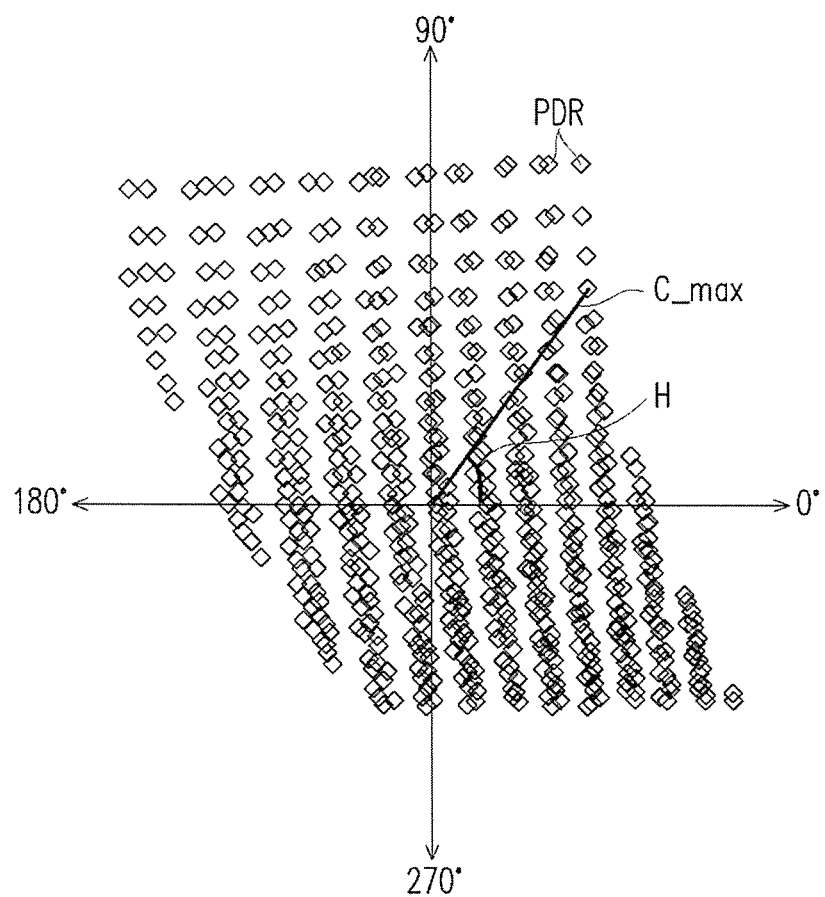
FIG. 3 is a schematic diagram of a color plane of the CIELCH color space according to an embodiment.

FIG. 2 is a space schematic diagram of the CIELCH color space according to an embodiment. FIG. 3 is a schematic diagram of a color plane of the CIELCH color space according to an embodiment. Please refer to FIG. 1 to FIG. 3. In the embodiment, the original color space is a RGB color space, that is, each first pixel data is a combination of RGB values which expressed as (R, G, B). A displayable range of the RGB color space in the CIELCH color space (as the image display space 200) is an irregular curved surface body.

In the embodiment, the image display space 200 is formed by a plurality of color planes 210. Each of the plurality of color planes 210 is corresponding to different luminance value L. Each color plane 210 has a color origin (0, 0). The CIELCH color space includes three components: a luminance value L, a color saturation value C, and a hue value H. The CIELCH color space basically has the same color space shape with the CIELab color space. The CIELab color space is different in that it is indicated by the luminance value L and color component values a, b, wherein the color component values a, b are in rectangular coordinate, and the color saturation value C and the hue value H are in polar coordinate. The color saturation value C=sqrt ($a^2+b^2$), and the hue value H=$\tan^{-1}$(b/a).

In an embodiment, the method to obtain the image display space 200 of the CIELCH color space corresponding to the RGB color space includes following steps. Firstly, convert all the color combinations of the RGB color space to a plurality of image reference data PDR of the CIELCH color space. And determine the display boundary (that is, the boundary of each color plane 210) of the CIELCH color space corresponding to the RGB color space according to the image reference data PDR, wherein each image reference data PDR is a combination of the luminance value L, the color saturation value C, and the hue value H converted from the color combination of the RGB color space. Lastly, define the space in the display boundary of the color plane 210 to the image display space 200.

In the RGB color space, presume the color value of red R is 0~255, the color value of green G is 0~255, and the color value of blue B is 0~255. Then, convert all the combinations of the color values of the RGB color space (There are 16777216 ($256^3$) combinations) to the color combinations with the luminance value L, the color saturation value C, and the hue value H of the CIELCH color space. In an embodiment, the range of the luminance value L is 0~100, the range of the hue value H is 0~360 degree, and the range of the color saturation value C is different according to different value of L and H.

In an embodiment, the luminance value L and the hue value H is rounded to a nearest integer. In other word, the luminance value L is 0, 1, 2, . . . , or 100, the hue value H is 0, 1, 2, . . . , 359 degree, and the number of the combinations of the luminance value L and the hue value H is 36360 (101×360). Furthermore, each combination corresponds to a max color saturation value C_max, and the whole image display space 200 has 36360 max color saturation values C_max (which can be the boundary value of the image display space).

In an embodiment, a method of restricting the third pixel data after the image adjustment process within the image display space of the CIELCH color space includes following steps. Define corresponding color plane 210 according to the luminance value L of each second pixel data of the CIELCH color space. Then, obtain the maximum saturation values C_max in the corresponding color plane 210 according to the hue value H of the second pixel data of the CIELCH color space, wherein the maximum saturation values C_max is the boundary value of the image display space 200. Calculate the calculation reference value VC according to the saturation values C of each second pixel data of the CIELCH color space and corresponded maximum saturation values C_max, wherein the calculation reference value VC is greater than or equal to 0 and smaller than or equal to 1.

Convert the calculation reference value VC to an image reference value VI according to the image adjustment process, wherein the image reference value VI may be different from the calculation reference value VC but still be greater than or equal to 0 and smaller than or equal to 1. Calculate the target saturation value C' according to the image reference value VI and the corresponding maximum saturation value C_max. Lastly, generate the corresponding third pixel data of the CIELCH color space according to the luminance value L, the hue value H of the second pixel data of the CIELCH color space, and the target saturation value C'. That is, the third pixel data is a combination of (L, C', H).

In an embodiment, the calculation reference value VC is equal to the saturation value C divided by the corresponding maximum saturation value C_max, and the target saturation value C' is equal to the image reference value VI multiplied by the maximum saturation value C_max. However, the invention is not limited herein.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An image processing method, applicable to an image processing device having a processor, comprising:
   receiving, by the processor, an image having a plurality of first pixel data of an original color space;
   converting, by the processor, the plurality of first pixel data of the original color space to a plurality of second pixel data of the CIELCH color space;
   performing, by the processor, an image adjustment process to the plurality of second pixel data of the CIELCH color space to obtain a plurality of third pixel data of the CIELCH color space, wherein the third pixel data are restricted within an image display space, wherein the image display space is determined by converting all color combinations of the original color space to a plurality of image reference data of the CIELCH color space, determining a display boundary of the CIELCH color space corresponding to the original color space according to the image reference data, defining a space in the display boundary as the image display space; and
   converting, by the processor, the plurality of third pixel data of the CIELCH color space to a plurality of fourth pixel data of the original color space to generate an image to be displayed by a display apparatus.

2. The image processing method according to claim 1, wherein each of the color values represented at the image reference data is an integer.

3. The image processing method according to claim 2, wherein the color values are rounded to the nearest integer.

4. The image processing method according to claim 1, wherein the step of performing, by the processor, an image adjustment process to the second pixel data of the CIELCH color space to obtain a plurality of third pixel data of the CIELCH color space comprises:
   obtaining a maximum saturation value according to a luminance value and a hue value of the second pixel data of the CIELCH color space, wherein the maximum saturation value is a boundary value of the image display space;
   calculating a calculation reference value according to a saturation value and the maximum saturation value of the second pixel data of the CIELCH color space, wherein the calculation reference value is greater than or equal to 0 and smaller than or equal to 1;

converting the calculation reference value to an image reference value according to the image adjustment process, wherein the image reference value is greater than or equal to 0 and smaller than or equal to 1;

calculating a target saturation value according to the image reference value and the maximum saturation value; and generating the corresponding third pixel data of the CIELCH color space according to a luminance value, the hue value of the second pixel data of the CIELCH color space, and the target saturation value.

5. The image processing method according to claim 4, wherein the calculation reference value is equal to the saturation value divided by the maximum saturation value.

6. The image processing method according to claim 4, wherein the target saturation value is equal to the image reference value multiplied by the maximum saturation value.

7. The image processing method according to claim 1, wherein the image adjustment process is at least one of an image brightening, a luminance correction, a contrast correction, and a sharpness correction.

8. The image processing method according to claim 1, wherein the original color space is one of an RGB color space, a HSV color space, a YCrCb color space, and a CIELuv color space.

9. An image processing method, applicable to an image processing apparatus having a processor, comprising:

receiving, by the processor, an image having a plurality of first pixel data of an original color space;

converting, by the processor, the plurality of first pixel data of the original color space to a plurality of second pixel data of the CIELCH color space;

performing, by the processor, an image adjustment process to the plurality of second pixel data of the CIELCH color space to obtain a plurality of third pixel data of the CIELCH color space, wherein the third pixel data are restricted within an image display space, wherein the plurality of third pixel data of the CIELCH is obtained by obtaining a maximum saturation value according to a luminance value and a hue value of the second pixel data of the CIELCH color space, calculating a calculation reference value according to a saturation value and the maximum saturation value of the second pixel data of the CIELCH color space, converting the calculation reference value to an image reference value according to the image adjustment process, calculating a target saturation value according to the image reference value and the maximum saturation value, generating the corresponding third pixel data of the CIELCH color space according to a luminance value, the hue value of the second pixel data of the CIELCH color space, and the target saturation value, wherein the maximum saturation value is a boundary value of the image display space, wherein the calculation reference value is greater than or equal to 0 and smaller than or equal to 1, and wherein the image reference value is greater than or equal to 0 and smaller than or equal to 1; and converting, by the processor, the plurality of third pixel data of the CIELCH color space to a plurality of fourth pixel data of the original color space to generate an image to be displayed by a display apparatus.

\* \* \* \* \*